United States Patent [19]

Mulder et al.

[11] E Patent Number: Re. 33,482

[45] Reissued Date of Patent: Dec. 11, 1990

[54] ADJUSTABLE POWDER SPRAY GUN

[75] Inventors: Douglas C. Mulder, Wellington, Ohio; David E. O'Ryan, Jackson, Mich.

[73] Assignee: Nordson Corporation, Amherst, Ohio

[21] Appl. No.: 242,057

[22] Filed: Sep. 8, 1988

Related U.S. Patent Documents

Reissue of:

[64] Patent No.: 4,613,083
Issued: Sep. 23, 1986
Appl. No.: 622,978
Filed: Jun. 21, 1984

[51] Int. Cl.[5] ..... B05B 5/02

[52] U.S. Cl. ..... 239/707; 118/622; 118/631; 427/28

[58] Field of Search ..... 239/706, 707, 708, 280.5, 239/283, 588, 690; 118/622, 629, 631; 248/287; 427/27, 28

[56] References Cited

U.S. PATENT DOCUMENTS

| | | | |
|---|---|---|---|
| 2,706,133 | 4/1955 | North, Jr. et al. | 239/588 |
| 2,748,459 | 6/1956 | Orr | 248/287 |
| 3,301,488 | 1/1967 | Norris | 239/752 |
| 3,625,424 | 12/1971 | Mantica | 239/707 |
| 4,215,648 | 8/1980 | Stamets et al. | 118/622 |
| 4,259,923 | 4/1981 | Breen | 118/622 |
| 4,380,320 | 4/1983 | Hollstein et al. | 239/697 |
| 4,638,951 | 1/1987 | Gabriel | 239/707 |

FOREIGN PATENT DOCUMENTS

| | | |
|---|---|---|
| 2628227 | 1/1977 | Fed. Rep. of Germany . |
| 8318744[U] | 10/1983 | Fed. Rep. of Germany . |

*Primary Examiner*—Andres Kashnikow
*Assistant Examiner*—Karen B. Merritt
*Attorney, Agent, or Firm*—Wood, Herron & Evans

[57] ABSTRACT

A powder spray gun which, in the presently preferred embodiment, is particularly adapted for spraying a particular powder spray onto the interior surfaces of containers and other target objects in a confined area. The apparatus includes a rigid tubular support member and a flexible powder transport tube. The rigid support member carries a high voltage cable having a charging electrode at one end. The flexible tube terminates in a discharge nozzle which may be adjustably mounted to the support member adjacent the charging electrode so as to permit variation of the angle at which the powder is released from the nozzle relative to the longitudinal axis of the support member. Intermediate the discharge nozzle and an upstream portion of the powder transport tube which is connected to the support member, the flexible tube is smoothly curved so as to prevent any sharp corners in the transport tube or the nozzle within which powder could collect and interrupt smooth, even discharge of powder from the gun.

6 Claims, 1 Drawing Sheet

ADJUSTABLE POWDER SPRAY GUN

Matter enclosed in heavy brackets [ ] appears in the original patent but forms no part of this reissue specification; matter printed in italics indicates the additions made by reissue.

BACKGROUND OF THE INVENTION

This invention relates to powder spray systems, and, more particularly, to an apparatus which, in the presently preferred embodiment, is operable to apply a solid particulate powder coating to the interior surface of a target object.

Powder coating materials are commonly used to coat or paint objects in industrial finishing applications. In such applications, a powder material, such as epoxy, polyester or porcelain frit, is conveyed to an applicator gun by air under pressure, and is ejected from the nozzle of the gun while entrained in an air stream. Quite commonly, an electrical charge is imparted to the powder as the air entrained powder is dispensed from the gun. This charge causes the powder to be electrostatically attracted toward the object to be coated which is generally at electrically ground potential. After coating, the object is usually moved into an oven where the powder coating material is melted and baked onto the coated surface.

In addition to providing a surface finish to objects, powder coatings have also been applied for other purposes, as for example, as lubricants in particulate powder form upon the surfaces of mold cavities to obtain a smooth, continuous surface on the molded part.

Powder spray guns used for spraying solid particulate powder materials generally include a handle connected to a barrel having a nozzle assembly at one end. The barrel is formed with a powder delivery passageway for transporting solid particulate powder to the nozzle assembly, and a passageway in which a high voltage cable is disposed which terminates with a charging electrode at the nozzle assembly. The solid particulate powder entrained in a stream of air flows through the powder passageway in the barrel along a path substantially parallel to its longitudinal axis, and then exits the barrel through the nozzle assembly where an electrostatic charge is imparted to the particulate powder by the charging electrode. One example of powder spray guns of this type is disclosed in the assignee's U.S. Pat. No. 4,380,320.

Standard powder spray guns such as described above, generally release the particulate powder from the nozzle assembly along an axis generally parallel to the direction of flow of the powder through the powder delivery passageway in the gun barrel. In some cases, a deflector is mounted in the nozzle assembly of the gun which contacts the stream of powder and deflects it at an angle to form a conical shaped spray pattern directed toward the surface of the object to be coated. Even with the spray pattern altered in this manner, the general direction of the powder spray is parallel to the longitudinal axis of the gun barrel. It has been found that in some applications, space limitations make it difficult to effectively coat the entire surface area of a target object with conventional powder spray guns. For example, the interior corners of closed rectangular or square boxes can be difficult to completely coat with known powder spray guns. If space limitations do not permit the barrel of the gun to be tilted so that the nozzle can be movably directed at different areas of a box interior, the interior corners of a box cannot be completely coated. This is because the spray pattern of conventional powder spray guns is directed parallel to the longitudinal axis of the gun barrel and not at varying angles relative to its longitudinal axis.

Modifications of known powder spray guns have been made to obtain complete coating of the interior surfaces of containers and other applications where space limitations restrict movement of the spray gun. In one design, the end of the gun barrel is turned upwardly at a sharp 90° angle so that the nozzle discharges the particulate powder material perpendicularly relative to the longitudinal axis of the powder delivery passageway in the gun barrel. The problem with this design is that powder becomes entrapped and collects in the sharply angled bend of the gun barrel which causes clogging of the powder flow and results in the discharge of an uneven spray pattern of powder from the nozzle.

In an attempt to solve this problem, powder spray guns have been provided with a tubular extension having an inlet end adapted to fit onto the nozzle end of the gun barrel and an outlet end adapted to spray the powder material onto a target object. These extensions are gradually bent or curved between their inlet and outlet ends so that the outlet end is disposed approximately perpendicularly relative to the inlet end and the longitudinal axis of the powder delivery passageway in the gun barrel. Curved powder spray gun extensions reduce the powder clogging problems encountered with sharp 90° bends in the powder flow path, but the extensions are incapable of permitting adjustment of the angle or direction in which the particulate powder material is released from their discharge end. While discharge of the powder material from the extension at an angle of 90° relative to the longitudinal axis of the barrel permits coating of a portion of the interior surfaces of a target object which cannot be reached with conventional spray guns, other angular positions of the barrel extension may be necessary to completely coat other portions of the interior of the same object or a different target object. Several extensions could be formed at angles other than 90°, but this would require a manufacturer to stock a number of individual extensions having different angles to completely coat the interior surfaces of one or more target objects.

It has therefore been an objective of this invention to provide a powder spray gun capable of spraying solid particulate powder material entrained in a stream of air over the entire interior surface of containers or over the surface of target objects in a confined area.

SUMMARY OF THE INVENTION

The powder spray gun of this invention which accomplishes this objective includes a support member having a longitudinal axis, a nozzle mounted upon the support member and being formed with a flow passage having an inlet at one end and a discharge orifice at the other end, a charging electrode mounted to the support member adjacent the discharge orifice of the nozzle, and a flexible powder transport tube for transmitting particulate powder material to the nozzle. The flexible tube has an upstream portion connected to the [support member] *mounting block* and a discharge end connected to the inlet end of the nozzle. Powder conveyed by the flexible tube to the nozzle is released through its discharge orifice where it is charged by the electrode. The nozzle may be adapted to be adjustably oriented relative to the longitudinal axis of the support member at any desired angle so as to permit wide variation of the direction in which the particulate powder material is sprayed from the discharge charge orifice for completely coating the interior surfaces of a container or any target object.

An advantage of this powder spray gun is that it enables solid particulate powder material to be sprayed in a uniform spray pattern from the discharge orifice of the nozzle regardless of the angle at which the nozzle is oriented relative to the support member. This result is primarily attributable to the powder transport tube being curved gradually between its upstream portion and the nozzle so that powder cannot become entrapped in sharp bends or curves of the tube.

Another specific aspect of this invention is predicated upon the specific adjustable connection for connecting the nozzle at different angles with respect to the support member. This adjustable connection includes an elongate member formed with a slot at each end, a threaded bore formed in each of the nozzle and support member, and a pair of set screws. The elongate member is positioned between the nozzle and support member so that one of its slots overlies the threaded bore in the nozzle and the other slot overlies the threaded bore in the support member. The set screws are then inserted through the slots and into the threaded bores to secure the support member in place and lock the nozzle in position relative to the fixed support member. In order to change the angle between the nozzle and the support member, the set screws are loosened and the elongate member is pivoted to permit movement of the nozzle relative to the support member. Preferably, the nozzle is movable between a position generally parallel to the longitudinal axis of the support member, or at a 0° angle relative thereto, to a position wherein the nozzle is disposed at an acute or obtuse angle relative to the longitudinal axis of the support member. Therefore, the powder spray is adapted to be directed along or parallel to the longitudinal axis of the support member or at acute or obtuse angles relative to the longitudinal axis of the support member.

Still another specific aspect of this invention is directed to the specific mounting assembly for connecting the support member and the upstream portion of the powder tube. This mounting assembly comprises a frame member, a rod movably mounted to the frame member and a block which is slidable along the rod and releasably mounted thereto. The upstream portion of the powder tube and one end of the support member are mounted to the block and movable therewith along the rod. The frame member which carries the rod and block is movable toward and away from the object to be coated and is pivotal 360° about *an axis substantially parallel to* the longitudinal axis of the support member to permit the nozzle release orifice to be movably directed at different portions of the interior surface of the target object to assure complete coating with the particulate powder material.

Still another aspect of this invention is directed to the nozzle orifice configuration and the orientation of that nozzle orifice. We have found that if the orifice [or] *of* the nozzle is rectangular in configuration, and if that rectangular orifice is oriented normally or perpendicular to a plane containing the powder transport tube, the resulting discharge of particulate powder material from the gun is more evenly distributed within the stream of air than when a conventional circular powder discharge orifice is utilized.

The powder spray gun of this invention achieves uniform powder coating in applications such as the interior surfaces of containers and the surfaces of mold cavities, wherein severe space limitations restrict manipulation of the gun. Unlike the barrels or barrel extensions of known powder spray guns, the nozzle connected to the powder tube of this invention is adapted to direct the powder spray at varying angles relative to the longitudinal axis of the support member or barrel which carries the high voltage cable and charging electrode. By adjusting the connection between the nozzle and support member of this invention, the powder spray can be directed at acute or obtuse angles relative to the longitudinal axis of the support member without the placement of any sharp corners in the flow path of the nozzle. This permits complete coverage of the interior corners and surfaces of a closed container, and various other hard to reach areas on the exterior or interior surfaces of target objects. Importantly, the relative angle between the charging electrode carried by the support member, and the nozzle mounted to the powder tube, can be field adjusted by the operator to accommodate different objects to be coated or different areas of a single object.

DESCRIPTION OF THE DRAWINGS

The structure, operation and advantages of this invention will become further apparent upon consideration of the following description taken in conjunction with the accompanying drawings, wherein.

DETAILED DESCRIPTION OF THE INVENTION

Figure 1:
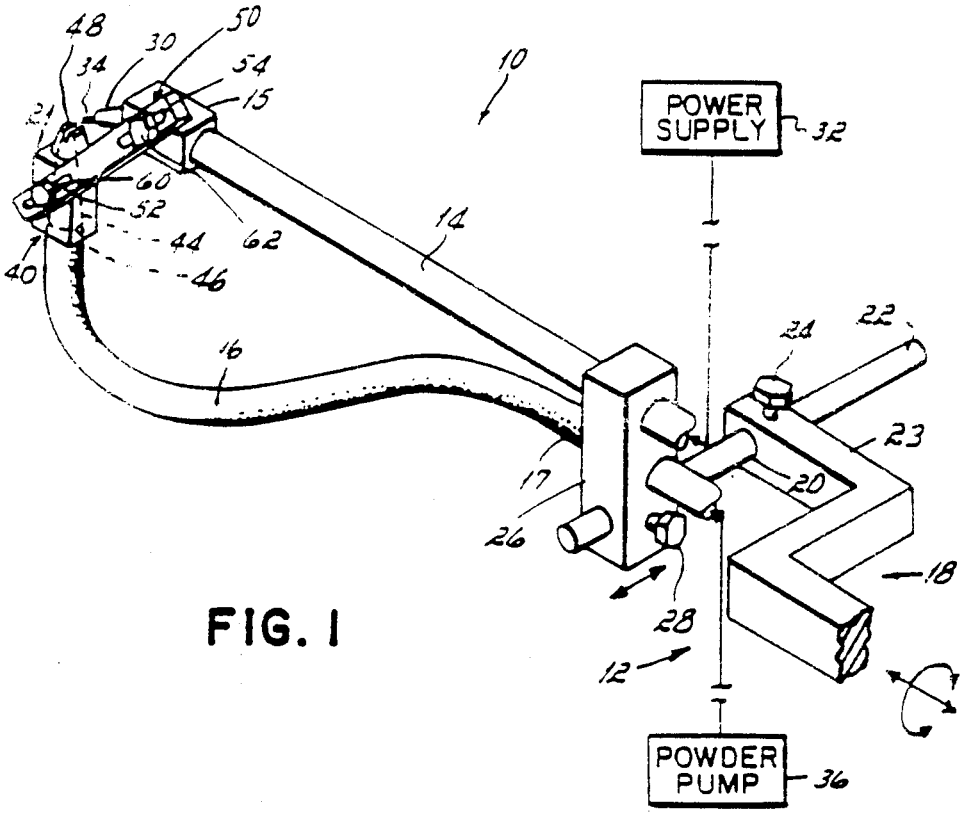
FIG. 1 is a schematic, perspective view of the powder spray apparatus of this invention.
Figure 2:
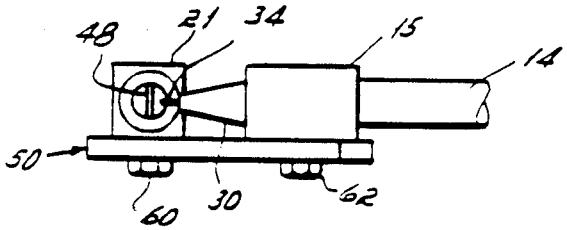
FIG. 2 is a plan view of the nozzle and charging electrode portion of the apparatus herein.

The powder spray apparatus 10 of this invention comprises a mounting assembly 12, a support member 14 fixed to the mounting assembly 12, and a flexible powder transmitting tube 16 having an upstream portion 17 connected to [the support member 14] *a mounting block 26* and a discharge end 40 connected to a nozzle 21. The nozzle 21 is adapted, in the presently preferred embodiment, to direct a solid particulate powder entrained in a stream of air onto the interior surfaces of a target object (not shown). In order to apply a uniform and complete coating of a solid particulate powder to all interior surfaces of an object, the mounting assembly 12 is movable longitudinally and rotatably relative to the object, and the direction at which the powder coating is discharged upon the object from the nozzle 21 may be angularly adjusted as described in detail below.

The mounting assembly 12 comprises a Z-shaped frame member 18 having a section [21] + *23* formed with a bore 20 which is adapted to receive a rod 22 slidable therealong and generally perpendicularly to section [21] *23*. A set screw 24 is inserted into frame member 18 and engages rod 22 to secure it in a desired position along section [21] *23*. A mounting block 26 is slidable along the rod 22, and is locked in place at a desired position therealong by a set screw 28. The frame member 18, rod 22 and mounting block 26 are movable as a unit longitudinally and rotatably relative to the longitudinal axis of section [21] *23* of the Z-shaped frame member 18. As discussed below, such movement of mounting assembly 12 permits the support member 14 and the nozzle [19] *21* to be positioned at differing portions of the interior surfaces of the object to be coated for complete application of the solid particulate powder thereto.

The support member 14 is preferably a rigid tube having a longitudinal axis which is formed of a non-conducting, substantially rigid material such as plastic. The support member 14 is mounted at one end to the mounting block 26 and extends outwardly therefrom so that its longitudinal axis is generally perpendicular to rod 22 and parallel to the longitudinal axis of frame section [21] *23*. A high voltage cable 30 is carried within the support member 14 and connects at one end to a power supply 32. The opposite end of cable 30 extends through the support member 14 to its outer end 15 where it connects the power supply 32 to a powder charging electrode 34. The charging electrode 34 extends outwardly from the outer end 15 of support member 14 immediately adjacent the nozzle 21.

The flexible powder tube 16 is formed with an inlet end (not shown) connected to a powder pump 36, an upstream portion 17 mounted to the mounting block 26 and a discharge end 40. The powder tube 16 is adapted to convey solid particulate powder entrained in a stream of air from the powder pump 36 to its discharge end 40. The nozzle 21, having a flow passage 44 terminating at one end in an inlet port 46 and at the opposite end in a smaller sized discharge orifice 48, is connected at its inlet port 46 to the discharge end 40 of the powder tube 16. Preferably, the discharge orifice 48 of nozzle 21 is rectangular in configuration for purposes to become apparent below. The nozzle 21 is connected to the outer end 15 of support member 14 so that its discharge orifice 48 is disposed immediately adjacent the charging electrode 34. An electrical charge is imparted to the particulate powder material exiting discharge orifice 48 by the charging electrode 34 so that it will be electrostatically attracted to the target object which is held at electrically ground potential.

In accordance with an important feature of this invention, [,] in the preferred embodiment, the nozzle 21 is adapted to be mounted at varying angular positions relative to support member 14 by an angle adjustment element 50. Alternatively, nozzle 21 can be mounted at a fixed angle with respect to support member 14. Adjustment element 50 is an elongate member formed with a slot 52 at one end and slot 54 at the opposite end. A threaded bore is formed in the nozzle 21 and a second threaded bore is formed in the support member 14, which bores are adapted to receive set screws 60, 62, respectively. The nozzle 21 is connected to the support member 14 by placing the adjustment element 50 between the nozzle 21 and support member 14 so that its slot 52 overlies the bore in nozzle 21 and its slot 54 overlies the bore in support member 14. The set screws 60, 62 are then inserted through the slots 52, 54 and into the bores to secure the adjustment element 50 in place and thereby mount the nozzle 21 in position relative to the fixed support member 14. In FIG. 1, the nozzle 21 is oriented relative to the support member 14 so that the path of the powder material through flow passage 44 and out of discharge orifice 48 is substantially perpendicular or at a 90° angle relative to the longitudinal axis of the support member 14. The angle between the powder flow path within flow passage 44 of nozzle 21 and the longitudinal axis of support member 14 may be adjusted within the range of about 0° to 90° by loosening set screws 60, 62 and sliding the nozzle 21 along slot 52 and/or sliding the adjustment element 50 along the set screw 62 of support member 14. At any angular position of nozzle 21 relative to support member 14, the discharge orifice 48 of nozzle 21 is disposed immediately adjacent the charging electrode 34 to assure that a charge is imparted to the solid particulate powder exiting the discharge orifice 48.

An important advantage of this invention is that the solid particulate powder may be directed through the discharge orifice 48 of nozzle 21 at varying angles relative to the longitudinal axis of support member 14 while still providing a substantially uniform and even spray pattern upon the target object. In FIG. 1, the flow path of the powder through flow passage 44 and discharge orifice 48 is generally perpendicular to the longitudinal axis of support member 14 so that the particulate powder material is sprayed directly upwardly in the plane of the drawing from the discharge orifice 48. This enables a uniform coating of powder to be applied to such areas as the interior corners and surfaces of a container. By adjusting the angular position of the nozzle 21 and its discharge orifice 48 relative to the longitudinal axis of support member 14, as described above, the solid particulate powder can be applied to other hard to reach areas of target object. This adjustment can be easily made in the field by the operator of apparatus 10 by simply loosening the set screws 60, 62 and positioning the nozzle 21 as desired.

In order to obtain a uniform spray pattern of solid particulate powder from the discharge orifice 48 at various angles of nozzle 21, the powder tube 16 is smoothly curved between its upstream portion [38] *17* connected to mounting block 26, and its discharge end 40 connected to nozzle 21. Preferably, the upstream portion [38] *17* of the powder tube 16 is disposed generally parallel to the longitudinal axis of support member 14 to aid in even distribution of the particulate powder flowing within the tube 16. The gradual curve of powder tube 16 helps reduce the concentration of solid particulates of powder which can accumulate on one side of the inner walls of the powder tube 16 due to centrifugal force. Sharply angled corners or other obstructions in powder tube 16 are eliminated since they could entrap the powder particulates and create clogging or an uneven flow of powder particulates to the nozzle 21 as found in prior art designs. Any concentration of particulates on one wall or area of the inner portion of powder tube 16 which does not occur in redirected by the flow passage 44 of nozzle 21 from its inlet port 46 to the discharge orifice 48. The tapered shape of the flow passage 44, from a greater cross section at inlet port 46 to a lesser cross section at discharge orifice 48, aids in uniformly distributing the powder particles in the air stream in which they are entrained. In addition, the rectangular shape of the discharge orifice 48 creates a flat or rectangular shaped spray pattern which further aids in producing a spray pattern in which the particulates are uniformly distributed. The connection between the nozzle 21 and discharge end 40 of powder tube 16 assures that the discharge orifice 48 of nozzle 21 is disposed substantially perpendicularly to a plane passing through the nozzle 21 and powder tube 16. As a result, the powder particulates are directed [vertically upwardly] through the nozzle 21 at a right angle relative to the rectangular shaped discharge orifice 48 regardless of the angular orientation of the nozzle 21 relative to support member 14. This further assists in producing a uniform spray pattern from the nozzle orifice 48.

While the invention has been described with reference to a preferred embodiment, it will be understood by those skilled in the art that various changes may be made and equivalents may be substituted for elements thereof without departing from the scope of the invention. In addition, many modifications could be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. Apparatus for applying a solid particulate powder coating to the interior surface of a target object, comprising:

a mounting block;

a hollow, rigid support member having a longitudinal axis, one end of said support member being mounted to said mounting block, the other, outer end of said support member mounting a powder charging electrode;

a high voltage cable carried [with] *within* said hollow support member for connecting said powder charging electrode to a source of electrical power;

a nozzle including a flow passage having an inlet port at one end and a discharge orifice at the other end, said inlet port receiving solid particulate powder and said discharge orifice ejecting the solid particulate powder in a predetermined pattern from said flow passage;

an adjustment element connected between said nozzle and said outer end of said support member for positioning said discharge orifice of said nozzle proximate said powder charging electrode to electrostatically charge solid particulate powder ejected from said discharge orifice;

means connected to said adjustment element for adjusting the [angle] *direction* of said nozzle flow passage in said nozzle relative to said longitudinal axis of said support member;

a flexible tube for transmitting solid particulate powder, said flexible tube having an upstream portion fixedly connected to said [support member *mounting block* and a discharge end fixedly connected to said inlet port of said nozzle flow passage;

said flexible tube being disposed in a plane oriented generally perpendicularly to said discharge orifice so as to direct the solid particulate powder [substantially vertically upwardly] through said nozzle flow passage;

said flexible tube being smoothly curved between said discharge end and said upstream portion so as to prevent powder from becoming entrapped in sharply angled corners of a powder flow path between said upstream portion of said flexible tube and said discharge orifice of said nozzle.

2. The apparatus of claim 1 wherein the upstream portion of said flexible tube has a section which extends generally parallel to the longitudinal axis of said support member.

3. The apparatus of claim 1 in which said nozzle is adapted to be adjusted to dispose said flow passage of said nozzle at acute or obtuse angles relative to said longitudinal axis of said support member.

4. The apparatus of claim 1 wherein:

said adjustment element comprises an elongate member formed with a slot at each end;

said means connected to said adjustment element comprises a pair of set screws, a threaded bore being formed in each of said nozzle and said support member;

said elongate member being positioned so that each of said slots therein overlies said threaded bore in one of said nozzle and said support member, said elongate member being releasably connected to said nozzle and said support member by inserting said set screws through said slots and tightening them within said threaded bores, said set screws being adapted to be loosened to permit movement of said nozzle so as to dispose said flow passage thereof at varying angles relative to the longitudinal axis of said support member.

5. The apparatus of claim 1 further including a mounting assembly comprising a frame member, a rod movably mounted to said frame member, and said mounting block movable along said rod, said support member being mounted to said mounting block so that said longitudinal axis of said support member is generally perpendicular to said rod, said mounting assembly being movable laterally and rotatably relative to *an axis substantially parallel to* the longitudinal axis of said support member.

6. The apparatus of claim 1 in which said discharge orifice of said nozzle is formed in a generally rectangular shape for spraying said powder spray onto said target object.

* * * * *

UNITED STATES PATENT AND TRADEMARK OFFICE

CERTIFICATE OF CORRECTION

PATENT NO. : RE 33,482

DATED : December 11, 1990

INVENTOR(S) : Douglas C. Mulder et al

It is certified that error appears in the above-identified patent and that said Letters Patent is hereby corrected as shown below:

Column 4, line 59, please delete "+".

Column 7, line 53, after "member", please insert --]--.

Signed and Sealed this

Twenty-eighth Day of September, 1993

Bruce Lehman

*Attest:*

BRUCE LEHMAN

*Attesting Officer*

*Commissioner of Patents and Trademarks*